(12) United States Patent
Marking

(10) Patent No.: US 9,120,362 B2
(45) Date of Patent: Sep. 1, 2015

(54) BYPASS FOR A SUSPENSION DAMPER

(71) Applicant: FOX FACTORY, INC., Scotts Valley, CA (US)

(72) Inventor: John Marking, El Cajon, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

(21) Appl. No.: 14/154,857

(22) Filed: Jan. 14, 2014

(65) Prior Publication Data
US 2014/0124312 A1 May 8, 2014

Related U.S. Application Data

(63) Continuation of application No. 13/175,244, filed on Jul. 1, 2011, now Pat. No. 8,627,932, which is a continuation-in-part of application No. 13/010,697, filed on Jan. 20, 2011, now Pat. No. 8,857,580, and a continuation-in-part of application No. 12/684,072, filed on Jan. 7, 2010, now abandoned, said application No. 13/175,244 is a continuation-in-part of application No. 12/684,072.

(60) Provisional application No. 61/361,127, filed on Jul. 2, 2010, provisional application No. 61/296,826, filed on Jan. 20, 2010, provisional application No. 61/143,152, filed on Jan. 7, 2009.

(51) Int. Cl.
| | |
|---|---|
| F16F 9/46 | (2006.01) |
| B60G 17/08 | (2006.01) |
| F16F 9/56 | (2006.01) |
| B60G 17/015 | (2006.01) |
| F16F 9/19 | (2006.01) |

(52) U.S. Cl.
CPC .............. *B60G 17/08* (2013.01); *B60G 17/015* (2013.01); *F16F 9/19* (2013.01); *F16F 9/46* (2013.01); *F16F 9/56* (2013.01); *Y10T 137/7935* (2015.04)

(58) Field of Classification Search
CPC .............. F16F 9/46; F16F 9/461; F16F 9/468
USPC .................. 188/313, 285–286, 322.13, 322.2, 188/299.1, 281, 266.1, 266.2, 266.5, 266.6
See application file for complete search history.

(56) References Cited

U.S. PATENT DOCUMENTS

| | | | |
|---|---|---|---|
| 3,202,413 A | 8/1965 | Colmerauer | |
| 3,714,953 A | 2/1973 | Solvang | |
| 4,333,668 A | 6/1982 | Hendrickson et al. | |
| 6,296,092 B1 | 10/2001 | Marking et al. | |
| 6,415,895 B2 | 7/2002 | Marking et al. | |
| 7,591,352 B2 | 9/2009 | Hanawa | |
| 7,628,259 B2 | 12/2009 | Norgaard et al. | |
| 8,627,932 B2* | 1/2014 | Marking | 188/313 |
| 2005/0098401 A1 | 5/2005 | Hamilton et al. | |
| 2006/0113834 A1 | 6/2006 | Hanawa | |

(Continued)

*Primary Examiner* — Thomas Irvin
(74) *Attorney, Agent, or Firm* — Patterson & Sheridan, LLP; David M. Haugen

(57) ABSTRACT

A vehicle suspension damper comprises a cylinder and a piston assembly including a damping piston along with working fluid within the cylinder. A bypass permits fluid to avoid dampening resistance of the damping piston. A fluid path through the bypass is controlled by a valve that is shifted by a piston surface when the contents of at least one predetermined volume is injected against the piston surface which acts upon the valve. In one embodiment, the bypass is remotely operable.

27 Claims, 6 Drawing Sheets

(56) References Cited

U.S. PATENT DOCUMENTS

| | | |
|---|---|---|
| 2007/0051573 A1 | 3/2007 | Norgaard et al. |
| 2010/0170760 A1 | 7/2010 | Marking |
| 2011/0214956 A1 | 9/2011 | Marking |
| 2012/0018263 A1 | 1/2012 | Marking |
| 2012/0048665 A1 | 3/2012 | Marking |
| 2012/0222927 A1 | 9/2012 | Marking |
| 2014/0008160 A1* | 1/2014 | Marking ............ 188/313 |
| 2014/0027219 A1* | 1/2014 | Marking ............ 188/313 |

\* cited by examiner

US 9,120,362 B2

BYPASS FOR A SUSPENSION DAMPER

BACKGROUND

Field of the Invention

Embodiments of the present invention generally relate to a damper assembly for a vehicle. More specifically, certain embodiments relate to a remotely operated bypass device used in conjunction with a vehicle damper.

Vehicle suspension systems typically include a spring component or components and a dampening component or components. Typically, mechanical springs, like helical springs are used with some type of viscous fluid-based dampening mechanism and the two are mounted functionally in parallel. In some instances features of the damper or spring are user-adjustable. What is needed is an improved method and apparatus for adjusting dampening characteristics, including remote adjustment.

SUMMARY OF THE INVENTION

The invention includes a vehicle suspension damper comprising a cylinder and a piston assembly comprising a damping piston along with working fluid within the cylinder. A bypass permits fluid to avoid dampening resistance of the damping piston. A fluid path through the bypass is controlled by a valve that is shifted by a piston surface when the contents of at least one predetermined volume is injected against the piston surface which acts upon the valve. In one embodiment, the bypass is remotely operable.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
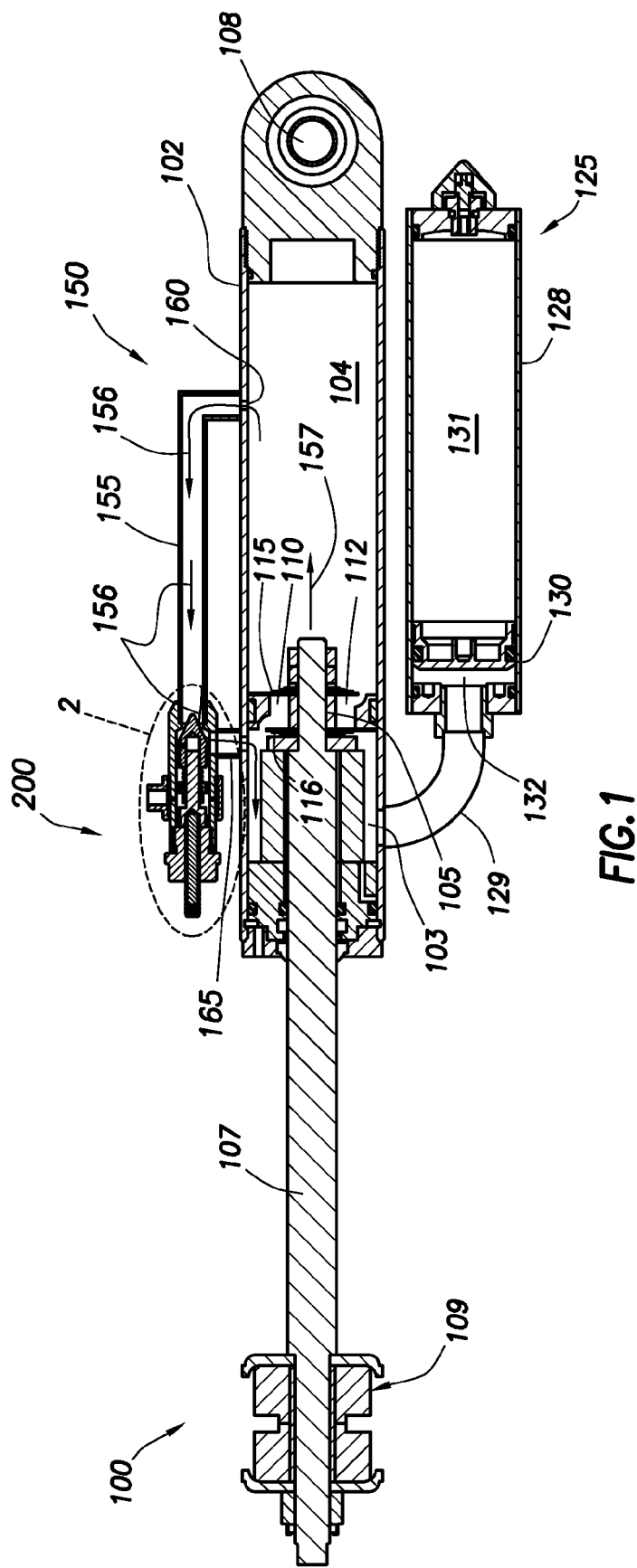
FIG. 1 is a section view showing a suspension damping unit with a bypass.

As used herein, the terms "down," "up," "downward," "upward," "lower," "upper" and other directional references are relative and are used for reference only. FIG. 1 is a section view of a suspension damping unit 100. The damper includes a cylinder portion 102 with a rod 107 and a piston 105. In one embodiment, the fluid meters from one side of the piston 105 to the other side by passing through flow paths 110, 112 formed in the piston 105. In the embodiment shown, shims 115, 116 are used to partially obstruct the flow paths 110, 112 in each direction. By selecting shims 115, 116 having certain desired stiffness characteristics, the dampening effects caused by the piston 105 can be increased or decreased and dampening rates can be different between the compression and rebound strokes of the piston 105. For example, shims 115 are configured to meter rebound flow from the rebound portion 103 of the cylinder 102 to the compression portion 104 of the cylinder 102. Shims 116, on the other hand, are configured to meter compression flow from the compression portion of the cylinder to the rebound portion. In one embodiment, shims 116 are not included on the rebound portion side, nor is there a compression flow path such as path 112, leaving the piston essentially "locked out" in the compression stroke without some means of flow bypass. Note that piston apertures (not shown) may be included in planes other than those shown (e.g. other than apertures used by paths 110 and 112) and further that such apertures may, or may not, be subject to the shims 115, 116 as shown (because for example, the shims 115, 116 may be clover-shaped or have some other non-circular shape). In one embodiment, the piston is solid and all damping flow must traverse a flow bypass and/or communicate with a reservoir.

A reservoir 125 is in fluid communication with the damper cylinder 102 for receiving and supplying damping fluid as the piston rod 107 moves in and out of the cylinder 102. The reservoir includes a cylinder portion 128 in fluid communication with the rebound portion 103 of the damper cylinder 102 via fluid conduit 129. The reservoir also includes a floating piston 130 with a volume of gas on a backside 131 ("blind end" side) of it, the gas being compressible as the reservoir cylinder 128, on the "frontside" 132 fills with damping fluid due to movement of the damper rod 107 and piston 105 into the damper cylinder 102. Certain features of reservoir type dampers are shown and described in U.S. Pat. No. 7,374,028, which is incorporated herein, in its entirety, by reference. The upper portion of the rod 107 is supplied with a bushing set 109 for connecting to a portion of a vehicle wheel suspension linkage. In another embodiment, not shown, the upper portion of the rod 107 (opposite the piston) may be supplied with an eyelet to be mounted to one part of the vehicle, while the lower part of the housing shown with an eyelet 108 is attached to another portion of the vehicle, such as the frame, that moves independently of the first part. A spring member (not shown) is usually mounted to act between the same portions of the vehicle as the damper. As the rod 107 and piston 105 move into cylinder 102 (during compression), the damping fluid slows the movement of the two portions of the vehicle relative to each other due, at least in part, to the incompressible fluid moving through the shimmed paths 112 (past shims 116) provided in the piston 105 and/or through a metered bypass 150, as will be described herein. As the rod 107 and piston 105 move out of the cylinder 102 (during extension or "rebound") fluid meters again through shimmed paths 110 and the flow rate and corresponding rebound rate is controlled, at least in part, by the shims 115.

In FIG. 1, the piston is shown at full extension and moving downward in a compression stroke, the movement shown by arrow 157. The bypass 150 includes a tubular body 155 that communicates with the damper cylinder 102 through entry 160 and exit 165 pathways. The bypass 150 permits damping fluid to travel from a first side of the piston 105 to the other side without traversing shimmed flow paths 110, 112 that may otherwise be traversed in a compression stroke of the damper. In FIG. 1, the bypass 150 is shown in an "open" position with the flow of fluid through the bypass shown by arrows 156 from a compression side to a rebound side of the piston 105. In the embodiment of FIG. 1, the bypass 150 includes a remotely controllable, needle-type check valve/throttle valve 200, located proximate an exit pathway 165 allowing flow in direction 156 and checking flow in opposite direction.

The entry pathway 160 to the bypass 150 in the embodiment shown in FIG. 1 is located towards a lower end of the damper cylinder 102. In one embodiment, as selected by design (e.g. axial location of entry 160), the bypass will not operate after the piston 105 passes the entry pathway 160 near the end of a compression stroke (or elsewhere in the stroke as desired). In one embodiment, this "position sensitive" feature ensures increased dampening will be in effect near the end of the compression stoke to help prevent the piston from approaching a "bottomed out" position (e.g. impact) in the cylinder 102. In some instances, multiple bypasses are used with a single damper and the entry pathways for each may be staggered axially along the length of the damper cylinder in order to provide an ever-increasing amount of dampening (via less bypass) as the piston moves through its compression stroke and towards the bottom of the damping cylinder. Each bypass may include some or all of the features described herein. Certain bypass damper features are described and shown in U.S. Pat. Nos. 6,296,092 and 6,415,895, each of which are incorporated herein, in its entirety, by reference. Additionally, the bypass and valve of the present embodiments can be used in any combination with the bypass valves shown and described in co-pending U.S. patent application Ser. Nos. 12/684,072 and 13/010,697.

Figure 2:
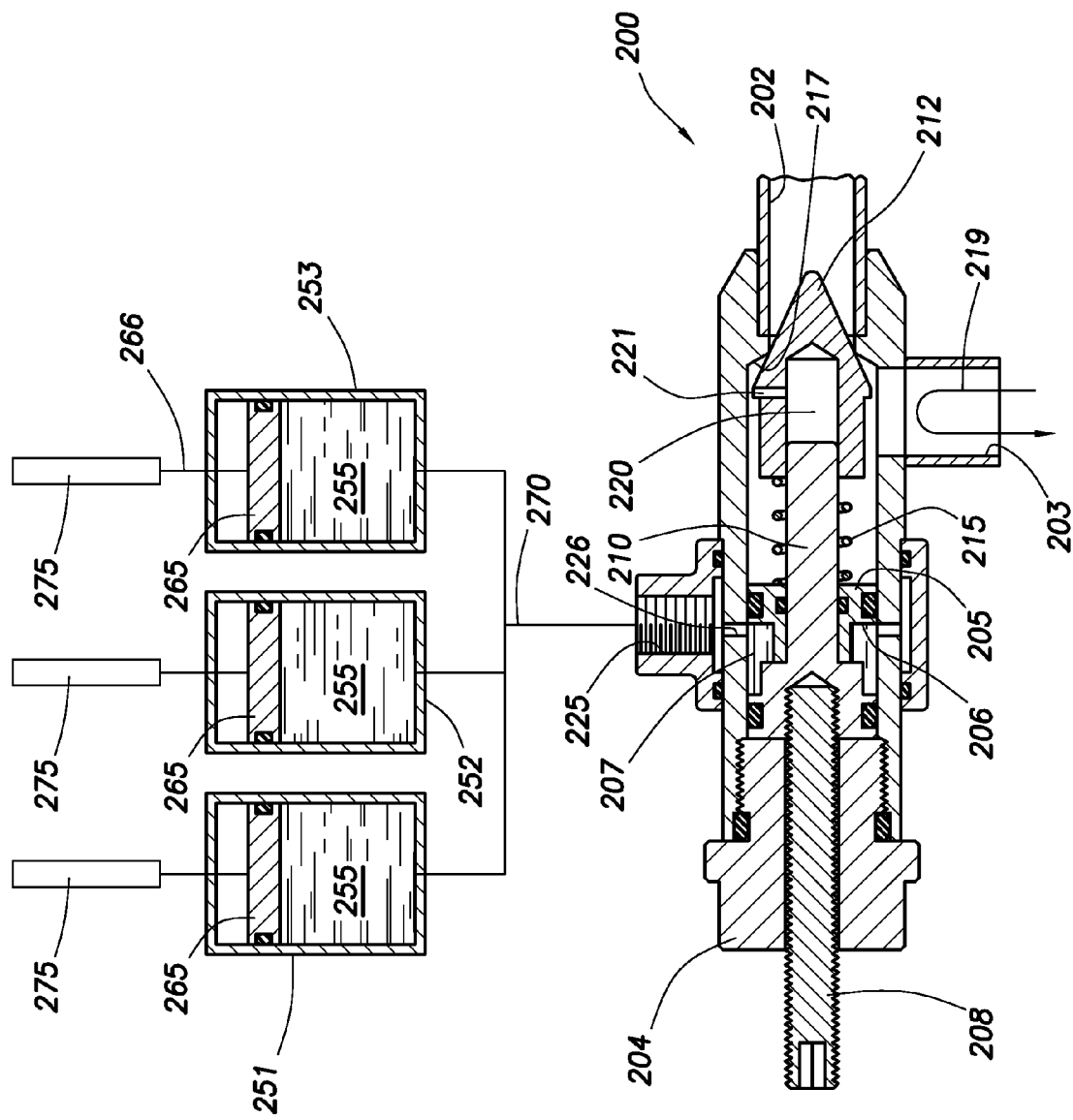
FIG. 2 is an enlarged section view showing a valve of the bypass in a closed position and showing a plurality of valve operating cylinders in selective communication with an annular piston surface of the valve.

FIGS. 2-5 are enlarged views showing the remotely operable needle valve 200 in various positions. FIG. 2 shows the valve 200 in a closed position (e.g. during a rebound stroke of the damper). The valve includes a valve body 204 housing a movable piston 205 which is sealed within the body. The piston 205 includes a sealed chamber 207 adjacent an annularly-shaped piston surface 206 at a first end thereof. The chamber 207 and piston surface 206 are in fluid communication with a port 225 accessed via opening 226. Two additional fluid communication points are provided in the body including an inlet 202 and an outlet 203 for fluid passing through the valve 200. Extending from a first end of the piston 205 is a shaft 210 having a cone-shaped valve member 212 (other shapes such as spherical or flat, with corresponding seats, will also work suitably well) disposed on an end thereof. The cone-shaped member 212 is telescopically mounted relative to, and movable on, the shaft 210 and is biased toward an extended position due to a spring 215 coaxially mounted on the shaft 210 between the member 212 and the piston 205. Due to the spring biasing, the cone-shaped member 212 normally seats itself against a seat 217 (as it is in FIG. 2) formed in an interior of the body 204. As shown, the cone shaped member 212 is seated against seat 217 due to the force of the spring 215 and absent an opposite force from fluid entering the valve along path 156 from the bypass (FIG. 1). As member 212 telescopes out, a gap 220 is formed between the end of the shaft 210 and an interior of member 212. A vent 221 is provided to relieve any pressure formed in the gap. With a fluid path through the valve (from 203 to 202) closed, fluid communication is substantially shut off from the rebound side of the cylinder into the valve body (and hence through the bypass back to the compression side) and its "dead-end" path is shown by arrow 219.

In one embodiment, there is a manual pre-load adjustment on the spring 215 permitting a user to hand-load or un-load the spring using a threaded member 208 that transmits motion of the piston 205 towards and away from the conical member, thereby changing the compression on the spring 215.

Also shown in FIG. 2 is a plurality of valve operating cylinders 251, 252, 253. In one embodiment, the cylinders each include a predetermined volume of fluid 255 that is selectively movable in and out of each cylindrical body through the action of a separate corresponding piston 265 and rod 266 for each cylindrical body. A fluid path 270 runs between each cylinder and port 225 of the valve body where annular piston surface 206 is exposed to the fluid. Because each cylinder has a specific volume of substantially incompressible fluid and because the volume of the sealed chamber 207 adjacent the annular piston surface 206 is known, the fluid contents of each cylinder can be used, individually, sequentially or simultaneously to move the piston a specific distance, thereby effecting the dampening characteristics of the system in a relatively predetermined and precise way. While the cylinders 251-253 can be operated in any fashion, in the embodiment shown each piston 265 and rod 266 is individually operated by a solenoid 275 and each solenoid, in turn, is operable from a remote location of the vehicle, like a cab of a motor vehicle or even the handlebar area of a motor or bicycle (not shown). Electrical power to the solenoids 275 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bypass valve there is no issue involved in stepping from hydraulic system pressure to desired suspension bypass operating pressure.

Figure 3:
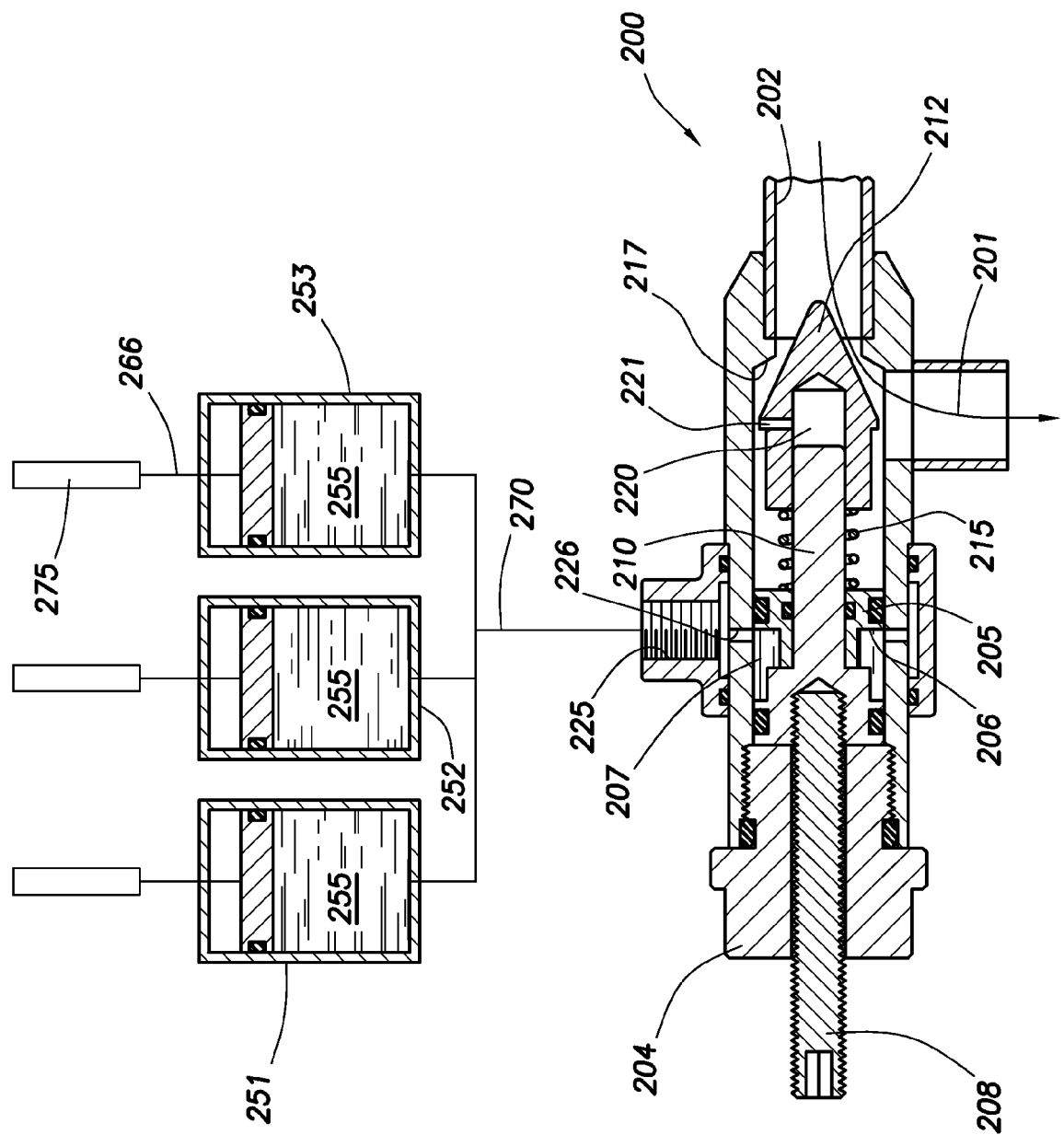
FIG. 3 is a section view showing the valve in an open position due to fluid flow through the bypass.

FIG. 3 is a section view showing the valve of FIG. 2 in an open position due to fluid flow. In the damping-open position, fluid flow through the bypass 150 provides adequate force on the member 212 to urge it backwards, at least partially loading the spring 215 and creating fluid path 201 from the bypass 150 into a rebound area 103 of the damper cylinder 102. The characteristics of the spring 215 are typically chosen to permit the valve 200 (e.g. member 212) to open at a predetermined bypass pressure, with a predetermined amount of control pressure applied to inlet 225, during a compression stroke of the damper 100. For a given spring 215, higher control pressure at inlet 225 will result in higher bypass pressure required to open the valve 200 and correspondingly higher damping resistance in the bypass 150 (more compression damping due to that bypass). In one embodiment, the control pressure at inlet 225 is raised high enough to effectively "lock" the bypass closed resulting in a substantially rigid compression damper (particularly true when a solid damping piston is also used).

In one embodiment, the valve is open in both directions when the valve member 212 is "topped out" against valve body 204. In another embodiment however, when the valve piston 205 is abutted or "topped out" against valve body 204 the spring 215 and relative dimensions of the valve 200 still allow for the cone member 212 to engage the valve seat 217 thereby closing the valve. In such embodiment backflow from the rebound side of the cylinder 102 to the compression side is always substantially closed and cracking pressure from flow along path 156 is determined by the pre-compression in the spring 215. In such embodiment, additional fluid pressure may be added to the inlet through port 225 to increase the cracking pressure for flow along path 156 and thereby increase compression damping through the bypass over that value provided by the spring compression "topped out." It is generally noteworthy that while the descriptions herein often relate to compression damping bypass and rebound shut off, some or all of the bypass channels (or channel) on a given suspension unit may be configured to allow rebound damping bypass and shut off or impede compression damping bypass.

Figure 4:
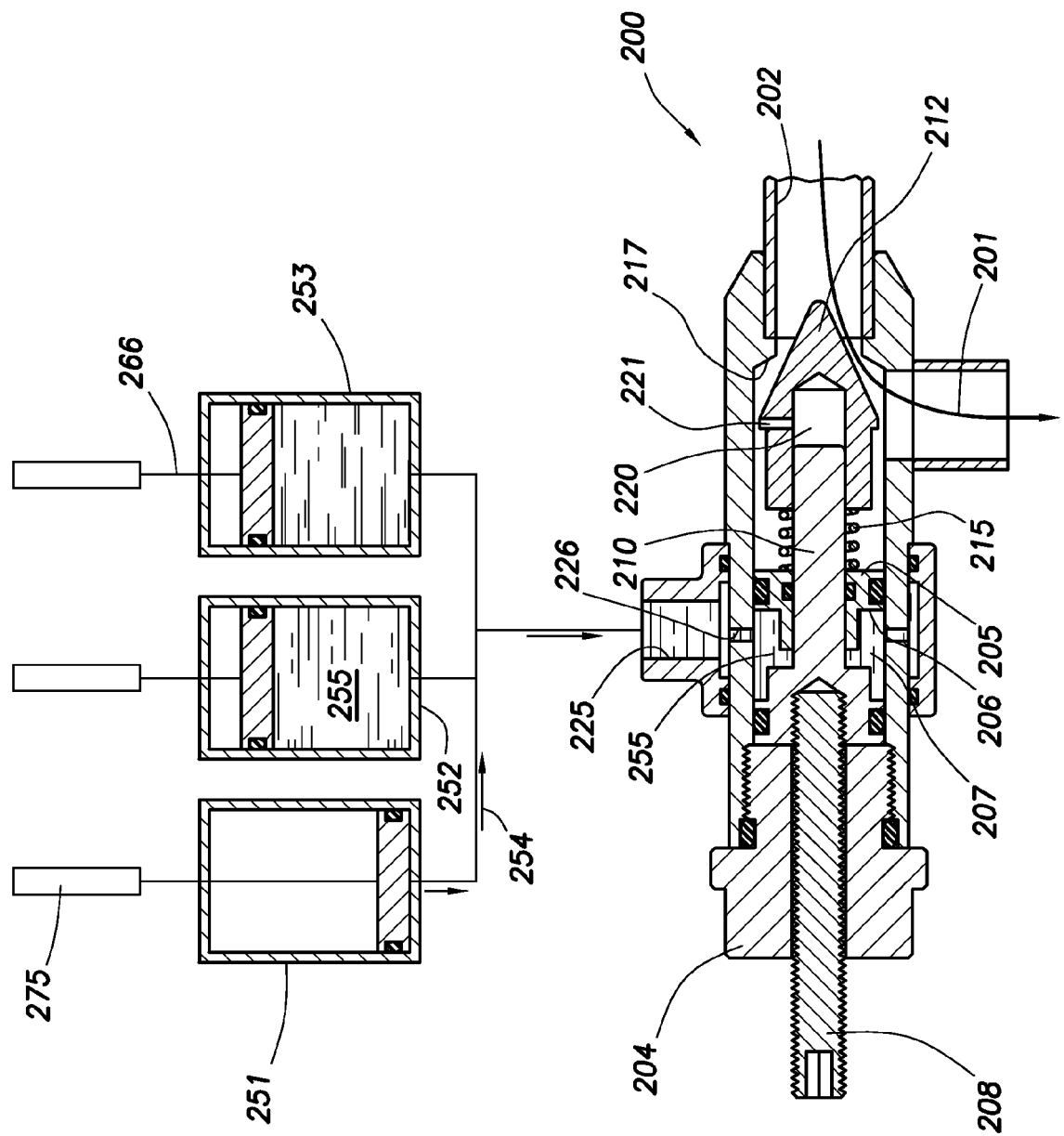
FIG. 4 is a section view showing the valve in an open position after the annular piston surface of the valve has been moved by the injection of fluid from a first valve operating cylinder.

FIG. 4 is a section view showing the valve 200 in an open position after the annular piston surface 206 of the valve has been moved by the injection of fluid from a first valve operating cylinder 251. Like FIG. 3, the valve 200 is also in a dampening-open position but the piston (and thus the spring 215) has been preloaded by the application of fluid to annular piston 206 from the first valve operating cylinder 251. As a result the fluid flow through the bypass required to move member 212 is increased. The valve operating cylinders 251-253 each include a predetermined, measured volume of fluid that is designed to cause the piston to move a specific amount, each thereby loading the spring 215 a specific known amount. For example, in FIG. 4 the first valve operating cylinder 251 has been emptied into sealed chamber 207 where it has acted on annular piston surface 206 and translated the piston a predetermined distance. The result is a further compression of the spring 215 thereby requiring a greater fluid flow on conical member 212 to force to open the bypass. The enlarged flow is illustrated by heavy arrow 201. The cylinders are designed to each contain a fluid volume that will create a desired movement of the piston when their contents are injected into the valve either alone or in combination. In one embodiment, for example, the cylinders are "plumbed" to operate in series and they can be sequentially emptied to increase dampening in discrete stages. The result is an increase in dampening every time another cylinder empties its contents. Conversely, causing the fluid volumes to return to their respective cylinders ensures that piston will return a certain distance, reducing dampening in the circuit as more fluid is permitted to bypass the effects of the piston shims.

In an example, when the valve 200 is in its normally closed position (shown in FIG. 2 with spring 215 relaxed), an area 'behind" the annular piston 205 has a 10 cc volume and is pre-filled with fluid. In order to translate the piston 205 to a point where dampening is increased a meaningful amount, the piston must move "forward" a distance that adds an additional 5 cc in volume to sealed area 207. By sizing cylinder 251 to hold a fluid volume of 5 cc, the piston 205 is ensured of moving forward to the desired position after the contents have been injected behind the annular piston surface 206.

Figure 5:
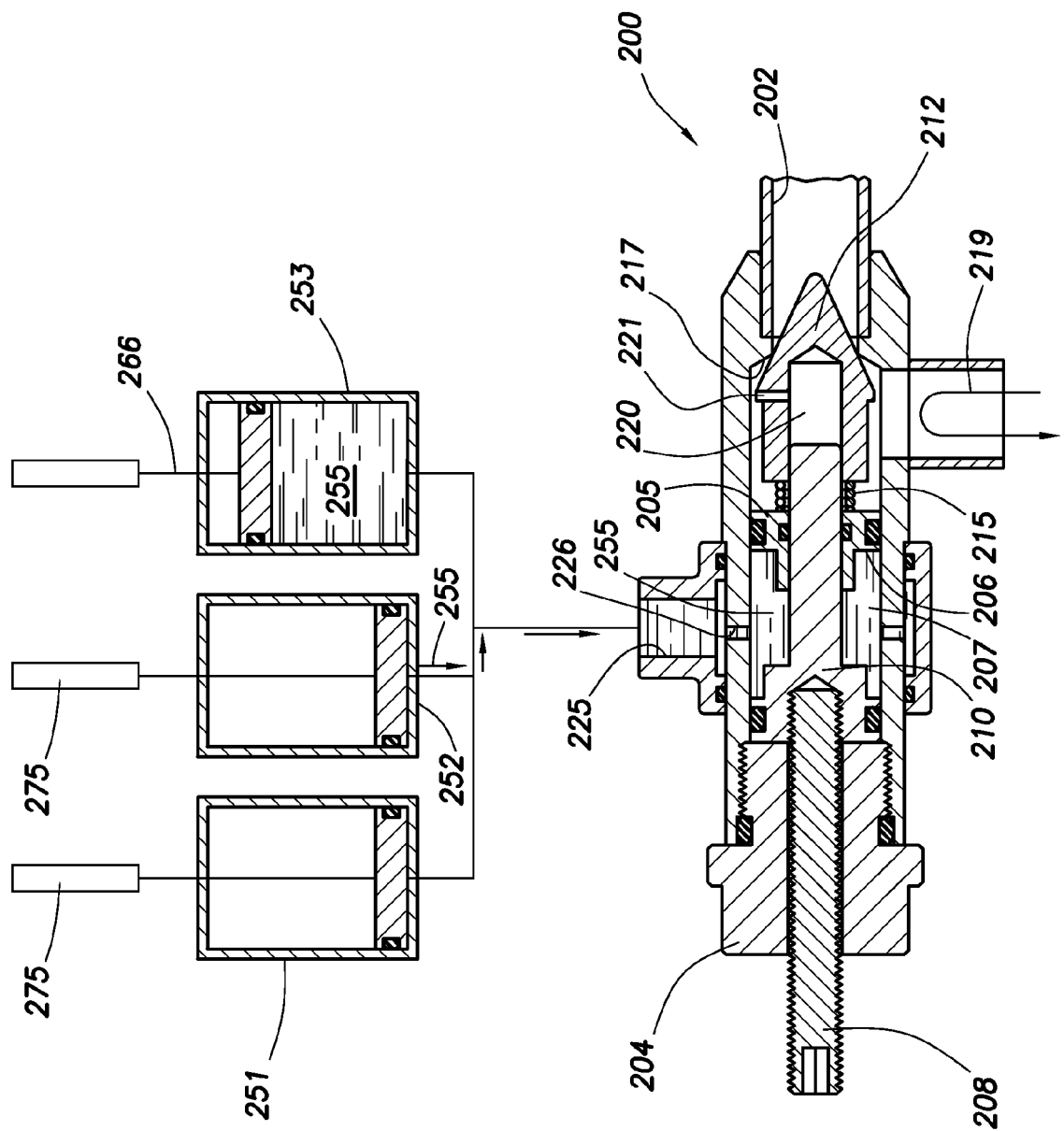
FIG. 5 is a section view showing the valve in a locked-out position due to fluid injected from the first and second operating cylinders.

In one embodiment, inlet 225 may be pressurized using one or more of the fluid cylinders 251-253 to shift the valve 200 to a third or "locked-out" position. FIG. 5 is a section view showing the valve 200 in a locked-out position due to fluid injected from the first and second operating cylinders 251, 252. Because the valve 200 is in a locked-out position fluid is prevented from flowing through the bypass in either direction regardless of compression or rebound stroke severity. An activating amount of fluid has been introduced via inlet 225 to act upon annular piston surface 206 and move the piston 205 and with it, member 212 toward seat 217. As illustrated, sufficient activating fluid has fully compressed the spring 215 (substantial stack out) thereby closing the cone member 212 against the seat 217 and sealing the bypass to both compression flow and rebound flow. In the embodiment shown, the valve 200 can be shifted to the third, locked-out position from either the first, closed position of FIG. 2 or the second, open position of FIG. 3, depending upon the operator cylinder or cylinders chosen and the fluid volume of those cylinders.

Note that when in the "locked out" position, the valve 200 as shown will open to compression flow if and when the compression flow pressure acting over the surface area of the seated valve cone member 212 exceeds the inlet 225 pressure acting over the surface area of the annular piston surface 206 (unless the cone member and valve assembly are mechanically "stacked out" such as by the mechanical screw adjuster). Such inlet 225 pressure is determined by the pistons, rods and solenoids that provide the force responsible for moving fluid between the operating cylinders and the closed area 207. Such pressure may be selected to correspond therefore to a desired compression overpressure relief value or "blow off" value thereby allowing compression bypass under "extreme" conditions even when the bypass is "locked out".

In the embodiment illustrated, the valve 200 is intended to be shifted to the locked-out position with control fluid acting upon annular piston surface 206 of piston 205. In one embodiment, the activating fluid via inlet 225 is sized so that the valve 200 is closed to rebound fluid (with the cone-shaped member 212 in seat 217) but with the spring 215 not fully compressed or stacked out. In such a position, a high enough compression force (e.g. compression flow) will still open the valve 200 and allow fluid to pass through the valve in a compression stroke. In one arrangement, the activating pressure, controlled remotely, may be adjusted between levels where the lock-out is not energized and levels where the lock-out is fully energized. The activating fluid may also be provided at intermediate levels to create more or less damping resistance through the bypass. Note that other separate damping valves (e.g. shims or pressure differential operated) may be added in the bypass channel generally to alter bypass damping characteristics inn compression or rebound or both. The various levels are possible by sizing, and in some cases combining the cylinders.

Figure 6:
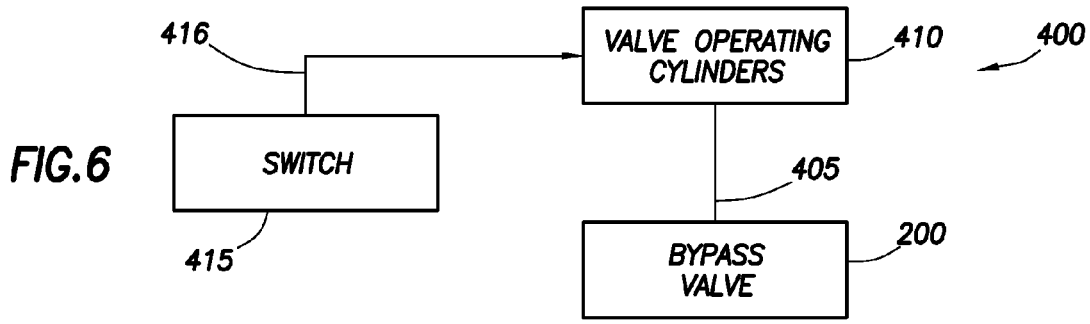
FIG. 6 is a schematic diagram showing a control arrangement for a remotely operated bypass.

FIG. 6 is a schematic diagram showing a control arrangement 400 for a remotely operated bypass. As illustrated, a signal line 416 runs from a switch 415 to any number of valve operating cylinders 410 which in turn, operate a bypass valve 200 via fluid path 405. While FIG. 6 is simplified and involves control of a single bypass valve 200, it will be understood that any number of valves and groups of control cylinders could be operated simultaneously or separately depending upon needs in a vehicular suspension system. Additional switches could permit individual operation of separate damper bypass valves.

A remotely operable bypass like the one described above is particularly useful with an on-/off-road vehicle. These vehicles can have as more than 20" of shock absorber travel to permit them to negotiate rough, uneven terrain at speed with usable shock absorbing function. In off-road applications, compliant dampening is necessary as the vehicle relies on its long travel suspension when encountering often large off-road obstacles. Operating a vehicle with very compliant, long travel suspension on a smooth road at higher speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may pitch and yaw excessively during braking and acceleration. With the remotely operated bypass dampening and "lock out" described herein, dampening characteristics of a shock absorber can be completely changed from a compliantly dampened "springy" arrangement to a highly dampened and "stiffer" (or fully locked out) system ideal for higher speeds on a smooth road. In one embodiment, where compression flow through the piston is completely blocked, closure of the bypass 150 results in substantial "lock out" of the suspension (the suspension is rendered essentially rigid). In one embodiment, where some compression flow is allowed through the piston (e.g. port 112 and shims 116), closure of the bypass 150 (closure of valve 200) results in a stiffer but still functional compression damper. In one embodiment, some of the bypass channels, of for example a shock having multiple bypass channels, having corresponding compression flow entries located "deeper" in the compression stroke are locked out (or restricted) while bypass channels having entries "higher" in the stroke are left open. That results in a long travel shock absorber being functionally converted to a much shorter travel shock absorber for, in one example, on highway use (in the short travel mode). Such a short travel mode is further advantageous in that it allows for elimination of undesired travel from the end of the stroke as opposed to causing a shortening of the damper. As such, the ride height of a so equipped vehicle is unaffected by travel mode adjustment from long to short. In one embodiment, the shims 116 are sized, to optimize damping when the bypass 150 is open and when bypass 150 is closed based on total anticipated driving conditions. In one embodiment, the bypass valve 200 is closed but may be opened at a predetermined compression flow pressure resulting in fairly stiff handling but maintaining an ability for the vehicle to absorb relatively large bumps. In one embodiment, a bypass channel having an opening 160 located axially toward an upward (or "rebound") end of cylinder 102 remains wide open while other bypass channels having corresponding openings 160 located axially more toward the compression end of cylinder 102 are closed or highly restricted. Such would result in a suspension that would readily absorb small amplitude compressions (smooth highway ride) but would resist large compression deflections of low-force magnitude (as during heavy cornering or braking) and would absorb large deflections of high-force magnitude. A vehicle so configured would ride well on pavement (smooth surface), would absorb large unexpected bumps and would generally not wallow when cornering or braking.

Figure 7:
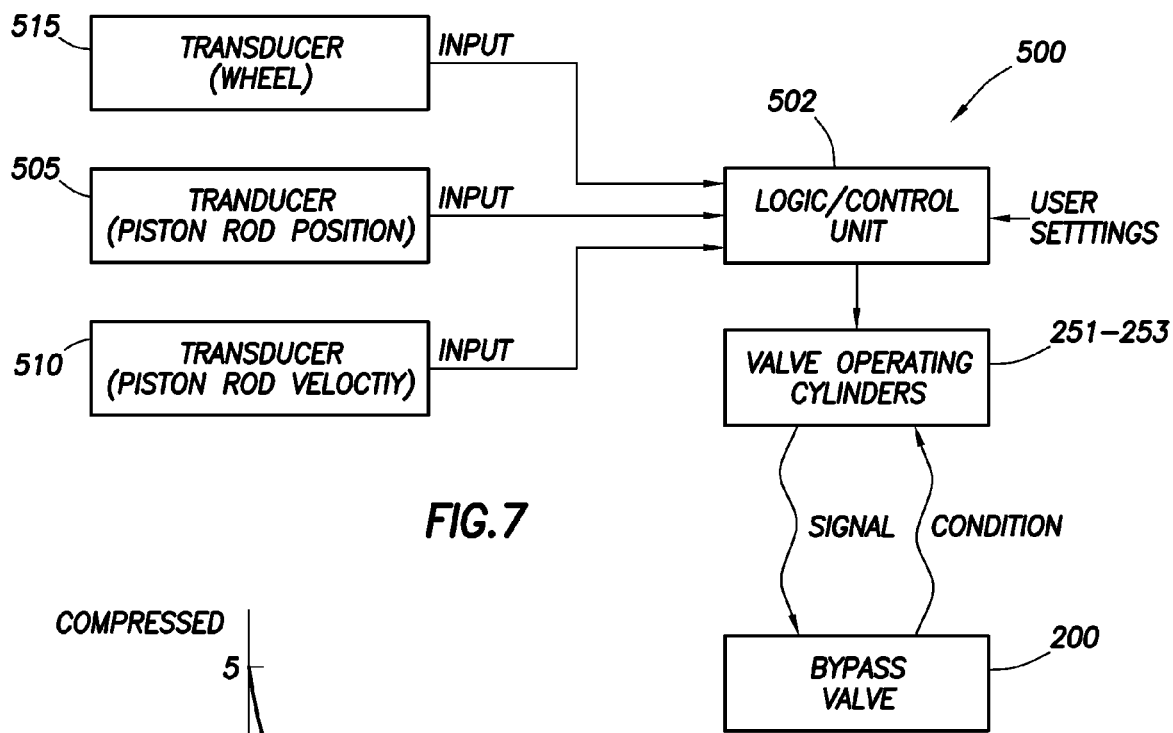
FIG. 7 is a schematic diagram showing another control arrangement for a remotely operated bypass.

In addition to, or in lieu of, the simple, switch operated remote arrangement of FIG. 6, the remote bypass can be operated automatically based upon one or more driving conditions. FIG. 7 shows a schematic diagram of a remote control system 500 based upon any or all of vehicle speed, damper rod speed, and damper rod position. One embodiment of the arrangement of FIG. 7 is designed to automatically increase dampening in a shock absorber in the event a damper rod reaches a certain velocity in its travel towards the bottom end of a damper at a predetermined speed of the vehicle. In one embodiment, the system 500 adds dampening (and control) in the event of rapid operation (e.g. high rod velocity) of the damper to avoid a bottoming out of the damper rod as well as a loss of control that can accompany rapid compression of a shock absorber with a relative long amount of travel. In one embodiment, the system 500 adds dampening (e.g. closes or throttles down the bypass) in the event that the rod velocity in compression is relatively low but the rod progresses past a certain point in the travel. Such configuration aids in stabilizing the vehicle against excessive low-rate suspension movement events such as cornering roll, braking and acceleration yaw and pitch and "g-out."

FIG. 7 illustrates, for example, a system 500 including three variables: rod speed, rod position and vehicle speed. Any or all of the variables shown may be considered by logic unit 502 in controlling the solenoids of the valve operating cylinders 251-253. Any other suitable vehicle operation variable may be used in addition to or in lieu of the variables 515, 505, 510 such as, for example, piston rod compression strain, eyelet strain, vehicle mounted accelerometer (or tilt/inclinometer) data or any other suitable vehicle or component performance data. In one embodiment, piston 105's position within cylinder 102 is determined using an accelerometer to sense modal resonance of cylinder 102. Such resonance will change depending on the position of the piston 105 and an on-board processor (computer) is calibrated to correlate resonance with axial position. In one embodiment, a suitable proximity sensor or linear coil transducer or other electromagnetic transducer is incorporated in the dampening cylinder to provide a sensor to monitor the position and/or speed of the piston (and suitable magnetic tag) with respect to the cylinder. In one embodiment, the magnetic transducer includes a waveguide and a magnet, such as a doughnut (toroidal) magnet that is joined to the cylinder and oriented such that the magnetic field generated by the magnet passes through the piston rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines. By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, either digital or analog, proportional to the calculated distance and/or velocity. A transducer-operated arrangement for measuring rod speed and velocity is described in U.S. Pat. No. 5,952,823 and that patent is incorporated by reference herein in its entirety.

While a transducer assembly located at the damper measures rod speed and location, a separate wheel speed transducer for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 7, the logic unit 502 with user-definable settings receives inputs from the rod speed 510 and location 505 transducers as well as the wheel speed transducer 515. The logic unit 502 is user-programmable and depending on the needs of the operator, the unit records the variables and then if certain criteria are met, the logic circuit sends its own signal to the bypass to either close or open (or optionally throttle) the bypass valve 200. Thereafter, the condition of the bypass valve is relayed back to the logic unit 502.

Figure 8:
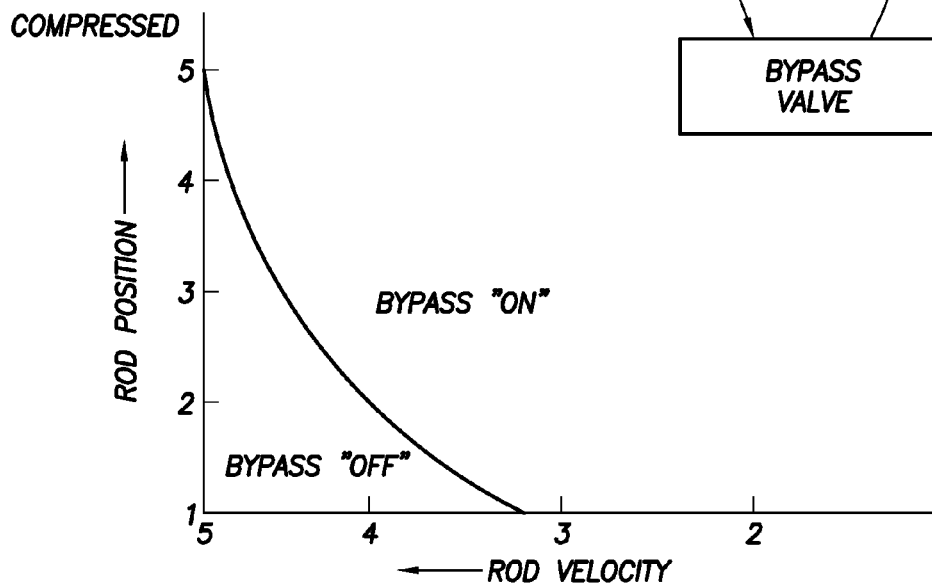
FIG. 8 is a graph showing some operational characteristics of the arrangement of FIG. 7.

FIG. 8 is a graph that illustrates a possible operation of one embodiment of the bypass system 500 of FIG. 7. The graph assumes a constant vehicle speed. For a given vehicle speed, rod position is shown on a y axis and rod velocity is shown on an x axis. The graph illustrates the possible on/off conditions of the bypass at combinations of relative rod position and relative rod velocity. For example, it may be desired that the bypass is operable (bypass "on") unless the rod is near its compressed position and/or the rod velocity is relatively high (such as is exemplified in FIG. 7). The on/off configurations of FIG. 7 are by way of example only and any other suitable on/off logic based on the variable shown or other suitable variables may be used. In one embodiment, it is desirable that the damper become relatively stiff at relatively low rod velocities and low rod compressive strain (corresponding for example to vehicle roll, pitch or yaw) but remains compliant in other positions. In one embodiment, the piston rod 107 includes a "blow off" (overpressure relief valve typically allowing overpressure flow from the compression side to the rebound side) valve positioned in a channel coaxially disposed though the rod 107 and communicating one side of the piston (and cylinder) with the other side of the piston (and cylinder) independently of the apertures 110,112 and the bypass 150.

In one embodiment, the logic shown in FIG. 7 assumes a single damper but the logic circuit is usable with any number of dampers or groups of dampers. For instance, the dampers on one side of the vehicle can be acted upon while the vehicles other dampers remain unaffected.

While the examples illustrated relate to manual operation and automated operation based upon specific parameters, the remotely operated bypass 150 can be used in a variety of ways with many different driving and road variables. In one example, the bypass 150 is controlled based upon vehicle speed in conjunction with the angular location of the vehicle's steering wheel. In this manner, by sensing the steering wheel turn severity (angle of rotation), additional dampening can be applied to one damper or one set of dampers on one side of the vehicle (suitable for example to mitigate cornering roll) in the event of a sharp turn at a relatively high speed. In another example, a transducer, such as an accelerometer, measures other aspects of the vehicle's suspension system, like axle force and/or moments applied to various parts of the vehicle, like steering tie rods, and directs change to the bypass valve positioning in response thereto. In another example, the bypass can be controlled at least in part by a pressure transducer measuring pressure in a vehicle tire and adding dampening characteristics to some or all of the wheels in the event of, for example, an increased or decreased pressure reading. In one embodiment, the damper bypass or bypasses are controlled in response to braking pressure (as measured, for example, by a brake pedal sensor or brake fluid pressure sensor or accelerometer). In still another example, a parameter might include a gyroscopic mechanism that monitors vehicle trajectory and identifies a "spin-out" or other loss of control condition and adds and/or reduces dampening to some or all of the vehicle's dampers in the event of a loss of control to help the operator of the vehicle to regain control.

While the foregoing is directed to embodiments of the present invention, other and further embodiments of the invention may be devised without departing from the basic scope thereof, and the scope thereof is determined by the claims that follow.

The invention claimed is:

1. A vehicle suspension damper comprising:
   a cylinder and a piston assembly comprising a piston;
   a working fluid within the cylinder;
   a bypass having a fluid pathway between a first side and a second side of the piston;
   a valve for controlling the flow of fluid through the bypass, the valve including a displaceable valve piston having a piston surface on one side thereof, the valve piston biasing a movable plug member towards a closed position when the valve piston is displaced;
   a biasing member disposed between the valve piston and the plug member, wherein the biasing member and the valve piston are operable in conjunction to urge the plug member towards the closed position; and
   at least two predetermined fluid volumes in selective communication with the piston surface for causing displacement of the valve piston; wherein each predetermined volume comprises a valve operating cylinder, the fluid contents of the valve operating cylinder injectable into the valve via a port in the valve to displace the valve piston and wherein the valve operating cylinders are substantially equal.

2. The damper of claim 1, wherein the biasing member is a spring.

3. The damper of claim 1, wherein the valve is disposed adjacent the bypass and is closed when the plug member obstructs a flow path between the cylinder and bypass and is open when the plug member permits flow.

4. The damper of claim 3, wherein the valve further includes a third, locked-out position.

5. The damper of claim 3, wherein dampening is increased when the valve is closed and decreased when the valve is open.

6. The damper of claim 1, wherein each predetermined fluid volume is injectable into the valve to displace the valve piston.

7. The damper of claim 6, wherein each valve operating cylinder includes a piston and rod that are operable to cause the fluid in each valve operating cylinder to be injected into the valve against the piston surface.

8. The damper of claim 7, wherein the fluid contents of the valve operating cylinders are returnable to the valve operating cylinders, thereby removing the biasing effect on the plug member towards the closed position.

9. The damper of claim 1, wherein the valve operating cylinders are operable separately.

10. The damper of claim 9, wherein fluid contents of a first operating cylinder cause the valve piston to be displaced a first distance and fluid contents of a second operating cylinder cause the valve piston to be displaced a second, additional distance.

11. The damper of claim 10, wherein the first and second distance are different distances.

12. The damper of claim 1, wherein the valve operating cylinders are operable simultaneously.

13. The damper of claim 1, wherein the valve is remotely controllable.

14. The damper of claim 13, wherein remote control is via valve control cylinders.

15. The damper of claim 14, wherein the valve control cylinders are solenoid-operated.

16. The damper of claim 13, further comprising a manually operable switch having at least two positions.

17. The damper of claim 16, wherein the switch is located in a passenger compartment of a vehicle.

18. The damper of claim 13, further including a load transducer for sensing a piston rod force created by a damper piston rod of the piston assembly.

19. The damper of claim 13, further comprising a transducer arranged to measure an angle associated with a steering wheel of a vehicle.

20. The damper of claim 1, wherein the valve is a one way valve arranged to permit fluid flow in a single direction.

21. The damper of claim 1, further including a passageway through the piston and limiting a flow rate of the working fluid through the piston in at least one direction.

22. The damper of claim 1, wherein the biasing member is disposed on the valve piston opposite the piston surface.

23. A vehicle suspension damper comprising:
a cylinder and a piston assembly comprising a piston;
a working fluid within the cylinder;
a bypass having a fluid pathway between a first side and a second side of the piston;
a valve for controlling the flow of fluid through the bypass, the valve including a displaceable valve piston having a piston surface, the valve piston urging a biasing member against a movable plug member such that the plug member is biased towards a closed position; and
at least one predetermined fluid volume in selective communication with the piston surface via a port in the valve, the at least one predetermined fluid volume for causing displacement of the valve piston;
wherein the at least one predetermined fluid volume is communicated through the port to the piston surface via at least one remotely-controllable solenoid-operated valve control cylinder.

24. The damper of claim 23, wherein the biasing member is movable to a preloaded position by a threaded member in the valve.

25. The damper of claim 23, wherein the plug member is slidable relative to a shaft in the valve.

26. The damper of claim 25, wherein a gap is formed between the plug member and the shaft when the plug member is in the closed position and wherein the plug member includes a port for venting the gap.

27. A vehicle suspension damper comprising:
a cylinder and a piston assembly comprising a piston;
a working fluid within the cylinder;
a bypass having a fluid pathway between a first side and a second side of the piston;
a valve for controlling the flow of fluid through the bypass, the valve including:
a stationary shaft,
a valve piston adjustable relative to the shaft, the valve piston having a piston surface, and
a biasing member disposed on the shaft between the valve piston and a plug member, the biasing member and the plug member movable relative to the shaft, the biasing member configured and arranged to bias the plug member towards a closed position wherein the plug member blocks fluid flow through the bypass; and
at least one predetermined fluid volume in selective communication with the piston surface via a port in the valve, the at least one predetermined fluid volume for adjusting a position of the valve piston,
wherein the at least one predetermined fluid volume is communicated through the port to the piston surface via at least one remotely-controllable solenoid-operated valve control cylinder.

* * * * *